Jan. 14, 1930. E. NELSON 1,743,976
SAFETY TRANSMISSION LOCK
Original Filed April 24, 1928
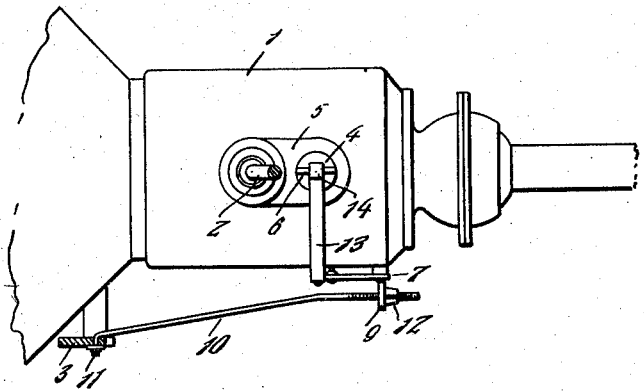
Inventor
Egery Nelson
By Clarence A. O'Brien
Attorney Patented Jan. 14, 1930

1,743,976

UNITED STATES PATENT OFFICE

EGERY NELSON, OF VINELAND, NEW JERSEY

SAFETY TRANSMISSION LOCK

Application filed April 24, 1928, Serial No. 272,369. Renewed November 27, 1929.

The present invention relates to improvements in automobile locks and has for its primary object to provide a simple and efficient means for normally holding the gear shift lever in a locked position, so that said gear shift lever cannot be actuated until the clutch pedal has been disengaged or depressed.

It is a well known fact that drivers of automobiles, especially beginners, frequently fail to depress the clutch pedal when they are about to shift the gears, and the present device is intended to lock the gears until the clutch is depressed, thus preventing the stripping of the gears and other injuries being caused.

One of the important objects of the present invention is to provide a safety transmission lock that can be readily and easily installed on automobiles provided with gear shift locks, without necessitating any alterations of the parts of the automobile with which the present invention is associated.

A still further object of the invention is to provide a device of the above mentioned character which will at all times be positive and efficient in its operation, the same being further simple in construction, inexpensive, strong and durable, and further well adapted to the purpose for which it is designed.

In the accompanying drawing, forming a part of this application, and in which like reference characters designate like parts throughout the several views:

Figure 1 is a top plan view of the device embodying my invention showing the same mounted on the transmission housing and connected to the clutch pedal or lever.

Figure 2 is a side elevation thereof, and

Figure 3 is a detail perspective view of a lock engaging member forming an important part of the present invention.

In the drawing, wherein for the purpose of illustration is shown the preferred embodiment of my invention, the numeral 1 designates the transmission housing, the gear shift lever that extends upwardly from the housing being shown at 2. The usual clutch member is illustrated at 3, and as is well known in the art, when the clutch is depressed, the gear shift lever 2 may be free to be shifted into operative engagement with the transmission mechanism in the housing 1, not shown.

Certain types of automobiles are provided with locking devices for the gear shift lever, and such a locking device is shown at 4, the same being arranged in the base 5, provided for the gear shift lever 2, and this locking member 4 is adapted for vertical movement and may be operated with a key, if desired. The lock is so actuated that when the same is in its downwardly moved position, the gear shift lever 2 is locked against shifting, while, when the lock is in its uppermost position, the gear shift lever may be freely operated to shift the gears.

In the present instance, I have shown the key 6 positioned in the vertically movable lock.

In the present invention, it is designed to make impossible the moving of the gear shift lever until the clutch is depressed, thus making it absolutely necessary for the driver to follow the correct procedure and shift the gears. To this end, I provide the bell crank lever 7 which is pivoted as at 8, on the side of the transmission housing 1. The depending arm is formed at its lower end with a laterally disposed apertured ear 9, through which extends the threaded end of the rod 10, the latter being operatively connected at its forward end to the pivoted clutch 3, as at 11. A thumb nut 12 is threaded, on the threaded end of the rod for engagement with the rear side of the apertured ear, and this rod provides an operative connection between the clutch and the bell crank lever, as clearly shown in Figure 2.

Forming a salient part of the present invention is the horizontally disposed bar 13, that extends across the top of the base 5, the inner end of this bar being formed with an inverted U-shaped key engaging stirrup 14. A rod 15 depends from the outer end of this bar, and the lower end of this rod is bent to form an inwardly directed foot 16, that is operatively connected to the outer end of the horizontally disposed arm of the bell crank lever 7.

A retractile coil spring 17 is secured at its upper end to the outer end portion of the horizontal arm of the bell crank lever 7, the other end of this retractile coil spring being secured to the side of the transmission housing 1, and this arrangement is also clearly shown in Figure 2.

With the parts arranged as shown in Figure 2, the clutch is in an engaged position, and the lock 4 is held downwardly by the action of the stirrup 14 in the bell crank lever 7, with which the retractile coil spring 17 cooperates, so that the gear shift lever cannot be shifted until the clutch 3 is depressed and manifestly when the clutch is depressed, a forward pull is exerted on the rod 10, which will cause the bell crank lever 7 to swing on its pivot 8, whereby to raise the rod 15 and the horizontal bar 13, upwardly, to disengage the stirrup 14 from the key 6, whereby to permit the lock 4 to move upwardly, whereby to unlock the gear shift lever and permit the latter to be moved to the desired position.

As soon as the operator releases his foot from the clutch, the parts will again assume the position shown in Figure 2 and thus the gear shift lever 2 will be locked in engaged position.

The provision of a safety transmission lock of the above mentioned character, will make it absolutely necessary for the driver to disengage the clutch before the gear shift lever can be operated, thus preventing any injury being caused to the transmission mechanism.

While I have shown the preferred embodiment of my invention, it is to be understood that various changes in the size, shape and arrangement of parts may be resorted to, without departing from the spirit of the invention and the scope of the appended claim.

Having thus described my invention, what I claim as new is:

In combination with the clutch pedal, the gear shift lever of a transmission, and a lock for normally holding the gear shift lever in an engaged position, of means cooperating with the lock and the clutch to release said lock and permit the actuation of the gear shift lever when the clutch is depressed, said means comprising a lock engaging member, a bell crank lever pivotally secured on the side of the transmission housing, one of the arms of the bell crank lever being disposed horizontally and secured at its outer end to the lock engaging member, a rod operatively connecting the other arm of the bell crank lever with the clutch whereby said lock engaging member is raised upwardly to an inoperative position when the clutch pedal is depressed, and a retractile coil spring for normally urging the lock engaging member downwardly to hold the lock in its lowermost position, said lock engaging member comprising a bar disposed horizontally above the top of the transmission housing, an inverted U-shaped stirrup formed on the inner end of the bar for cooperation with the lock, and a rod depending from the outer end of the bar for connection with the horizontal arm of the bell crank lever.

In testimony whereof I affix my signature.

EGERY NELSON.